US009012018B2

(12) United States Patent
Uyttendaele et al.

(10) Patent No.: US 9,012,018 B2
(45) Date of Patent: Apr. 21, 2015

(54) LASER MARKABLE SECURITY FILM

(75) Inventors: Carlo Uyttendaele, Mortsel (BE); Bart Aerts, Rumst (BE); Bart Waumans, Puurs (BE); Ingrid Geuens, Emblem (BE)

(73) Assignee: Agfa-Gevaert N.V., Mortsel (BE)

(*) Notice: Subject to any disclaimer, the term of this patent is extended or adjusted under 35 U.S.C. 154(b) by 137 days.

(21) Appl. No.: 13/509,462

(22) PCT Filed: Dec. 17, 2010

(86) PCT No.: PCT/EP2010/070065
§ 371 (c)(1), (2), (4) Date: May 11, 2012

(87) PCT Pub. No.: WO2011/073384
PCT Pub. Date: Jun. 23, 2011

(65) Prior Publication Data

US 2012/0231240 A1 Sep. 13, 2012

Related U.S. Application Data

(60) Provisional application No. 61/287,714, filed on Dec. 18, 2009.

(30) Foreign Application Priority Data

Dec. 18, 2009 (EP) .................................... 09179800

(51) Int. Cl.
*B32B 27/00* (2006.01)
*B32B 7/00* (2006.01)
(Continued)

(52) U.S. Cl.
CPC ............... *B41M 5/267* (2013.01); *B41M 5/405* (2013.01); *B41M 5/41* (2013.01); *B41M 2205/04* (2013.01); *B42D 25/41* (2014.10); *B42D 25/00* (2014.10)

(58) Field of Classification Search
CPC ............ B41M 5/26; B41M 5/40; B41M 5/41; B32B 3/00; B32B 27/00; B32B 27/08; B32B 27/32; B32B 27/36; B32B 27/30
See application file for complete search history.

(56) References Cited

U.S. PATENT DOCUMENTS 3,479,426 A 11/1969 De Smedt
3,578,845 A 5/1971 Brooks et al.
(Continued)

FOREIGN PATENT DOCUMENTS

AU 42586/89 4/1991
DE 3812454 10/1989
(Continued)

OTHER PUBLICATIONS

EP Search Report for EP07116829.8, Aug. 20, 2008, 5 pp.
(Continued)

*Primary Examiner* — Mark Ruthkosky
*Assistant Examiner* — Laura C Powers
(74) *Attorney, Agent, or Firm* — Leydig, Voit & Mayer, Ltd.

(57) ABSTRACT

A security film including a support (1) and a laser markable layer (3), wherein the laser markable layer includes i) a laser additive; ii) a polymer selected from the group consisting of polystyrene, polycarbonate and styrene acrylonitrile; iii) an initiator; and iv) at least 15 wt % of radiation curable compound based on the total dry weight of the laser markable layer, wherein the radiation curable compound has a viscosity of less than 100 mPa·s at 25° C. and at a shear rate of 100 $s^{-1}$. A security document and a method for preparing the security film are also disclosed.

20 Claims, 4 Drawing Sheets

(51) Int. Cl.

| | |
|---|---|
| ***B32B 3/00*** | (2006.01) |
| ***B41M 3/14*** | (2006.01) |
| ***B42D 15/00*** | (2006.01) |
| ***B41M 5/26*** | (2006.01) |
| ***B41M 5/40*** | (2006.01) |
| ***B41M 5/41*** | (2006.01) |
| ***B42D 25/41*** | (2014.01) |
| ***B42D 25/00*** | (2014.01) |

(56) References Cited

U.S. PATENT DOCUMENTS

| | | | | |
|---|---|---|---|---|
| 3,649,336 | A | 3/1972 | Van Paesschen et al. | |
| 3,867,148 | A | 2/1975 | O'Keeffe et al. | |
| 4,082,901 | A | 4/1978 | Laridon et al. | |
| 4,096,933 | A | 6/1978 | Massa | |
| 4,223,918 | A | 9/1980 | Smoczynski | |
| 4,352,716 | A | 10/1982 | Schaible et al. | |
| 4,450,024 | A | 5/1984 | Haghiri-Tehrani et al. | |
| 4,480,177 | A | 10/1984 | Allen | |
| 4,506,916 | A | 3/1985 | Kuhl | |
| 4,544,181 | A | 10/1985 | Maurer et al. | |
| 4,552,383 | A | 11/1985 | Hoppe et al. | |
| 4,556,628 | A | 12/1985 | Greschner et al. | |
| 4,853,300 | A | 8/1989 | Pike | |
| 4,856,857 | A | 8/1989 | Takeuchi et al. | |
| 4,913,858 | A | 4/1990 | Miekka et al. | |
| 5,142,383 | A | 8/1992 | Mallik | |
| 5,145,212 | A | 9/1992 | Mallik | |
| 5,164,227 | A | 11/1992 | Miekka et al. | |
| 5,171,625 | A | 12/1992 | Newton | |
| 5,223,081 | A | 6/1993 | Doan | |
| 5,354,613 | A | 10/1994 | Quintens et al. | |
| 5,407,893 | A | 4/1995 | Koshizuka et al. | |
| 5,527,758 | A | 6/1996 | Uyttendaele et al. | |
| 5,589,317 | A | 12/1996 | Defieuw et al. | |
| 5,753,352 | A | 5/1998 | Vanmaele et al. | |
| 5,804,026 | A | 9/1998 | Vogt | |
| 5,863,859 | A | 1/1999 | Uytterhoeven et al. | |
| 5,869,140 | A | 2/1999 | Blohowiak et al. | |
| 6,010,817 | A * | 1/2000 | Van Damme et al. | 430/200 |
| 6,090,747 | A | 7/2000 | Dronzek | |
| 6,210,777 | B1 | 4/2001 | Vermeulen et al. | |
| 6,254,971 | B1 | 7/2001 | Katayose et al. | |
| 6,283,378 | B1 | 9/2001 | Welling | |
| 6,328,342 | B1 | 12/2001 | Belousov et al. | |
| 6,514,367 | B1 | 2/2003 | Leighton | |
| RE38,321 | E | 11/2003 | Uyama et al. | |
| 6,693,657 | B2 | 2/2004 | Carroll, Jr. et al. | |
| 6,803,114 | B1 | 10/2004 | Vere et al. | |
| 7,097,899 | B2 | 8/2006 | Daems et al. | |
| 7,541,088 | B2 * | 6/2009 | Bennett et al. | 428/216 |
| 8,293,450 | B2 * | 10/2012 | Kasperchik et al. | 430/270.1 |
| 2001/0016426 | A1 | 8/2001 | Lee et al. | |
| 2002/0136582 | A1 | 9/2002 | Verdyck | |
| 2003/0068491 | A1 | 4/2003 | Otaki et al. | |
| 2003/0075275 | A1 | 4/2003 | Kubota | |
| 2003/0183695 | A1 | 10/2003 | Labrec et al. | |
| 2004/0180520 | A1 | 9/2004 | Janke | |
| 2005/0087606 | A1 | 4/2005 | McCumber | |
| 2005/0095408 | A1 * | 5/2005 | LaBrec et al. | 428/195.1 |
| 2006/0127623 | A1 | 6/2006 | Ishida | |
| 2006/0193021 | A1 | 8/2006 | Ishimoto et al. | |
| 2006/0216872 | A1 | 9/2006 | Arai et al. | |
| 2007/0017647 | A1 | 1/2007 | Habik et al. | |
| 2007/0026585 | A1 | 2/2007 | Wong et al. | |
| 2008/0192103 | A1 * | 8/2008 | Daems et al. | 347/102 |
| 2009/0032602 | A1 | 2/2009 | Nishi et al. | |
| 2009/0063058 | A1 | 3/2009 | Rehm et al. | |
| 2009/0187435 | A1 | 7/2009 | Carr et al. | |
| 2010/0201115 | A1 | 8/2010 | Geuens | |
| 2011/0204616 | A1 | 8/2011 | Geuens | |
| 2011/0266788 | A1 | 11/2011 | Geuens | |
| 2012/0217736 | A1 | 8/2012 | Uyttendaele et al. | |

FOREIGN PATENT DOCUMENTS

| | | |
|---|---|---|
| DE | 102007037982 | 2/2009 |
| EP | 0544035 | 6/1993 |
| EP | 0552656 | 7/1993 |
| EP | 0622217 | 11/1994 |
| EP | 0761468 | 3/1997 |
| EP | 0792756 | 9/1997 |
| EP | 0866750 | 9/1998 |
| EP | 1170630 | 1/2002 |
| EP | 1632362 | 3/2006 |
| EP | 1852269 | 11/2007 |
| EP | 1852270 | 11/2007 |
| EP | 2042576 | 4/2009 |
| GB | 811066 | 3/1959 |
| GB | 1439478 | 6/1976 |
| GB | 1441591 | 7/1976 |
| GB | 2132136 | 7/1984 |
| GB | 2279610 | 1/1995 |
| GB | 2338678 | 12/1999 |
| GB | 2400074 | 10/2004 |
| JP | 58-172676 | 10/1983 |
| JP | 63-215732 | 9/1988 |
| JP | 03-270993 | 12/1991 |
| JP | 04-123191 | 4/1992 |
| JP | 07-089225 | 4/1995 |
| JP | 08-300810 | 11/1996 |
| JP | 10-119163 | 5/1998 |
| JP | 00-085282 | 3/2000 |
| JP | 00-251108 | 9/2000 |
| JP | 05-293396 | 10/2005 |
| JP | 07-268712 | 10/2007 |
| WO | WO 99/24934 | 5/1999 |
| WO | WO 99/51446 | 10/1999 |
| WO | WO 00/18591 | 4/2000 |
| WO | WO 01/54917 | 8/2001 |
| WO | WO 02/074548 | 9/2002 |
| WO | WO 03/055638 | 7/2003 |
| WO | WO 2006/042714 A1 | 4/2006 |
| WO | WO 2007/023410 | 3/2007 |
| WO | WO 2007/027619 | 3/2007 |
| WO | WO 2007/132214 | 11/2007 |
| WO | WO 2008/084315 | 7/2008 |
| WO | WO 2008/110892 | 9/2008 |
| WO | WO 2009/037330 | 3/2009 |
| WO | WO 2009/063058 A1 | 5/2009 |
| WO | WO 2011/073383 | 6/2011 |
| WO | WO 2011/073384 | 6/2011 |

OTHER PUBLICATIONS

EP Search Report for EP08172496.5, Feb. 25, 2009, 6 pp.
Int'l Search Report for PCT/EP2008/062501, Jan. 7, 2009, 2 pp.
Int'l Search Report for PCT/EP2008/062512, Jan. 26, 2009, 2 pp.
Int'l Search Report for PCT/EP2009/053905, Jul. 15, 2009, 4 pp.
Int'l Search Report for PCT/EP2009/065882, Feb. 15, 2010, 4 pp.
Int'l Search Report for PCT/EP2010/069299, Apr. 8, 2011, 2 pp.
Int'l Search Report for PCT/EP2010/070064, Apr. 8, 2011, 3 pp.
Int'l Search Report for PCT/EP2010/070065, Apr. 7, 2011, 2 pp.
"Adhesion and Bonding," *Encyclopedia of Polymer and Engineering*, Mark et al., ed., pp. 476-577 (1985).
International Preliminary Report on Patentability in corresponding International Patent Application No. PCT/EP2010/070065, mailed Jun. 19, 2012.

* cited by examiner

LASER MARKABLE SECURITY FILM

CROSS-REFERENCE TO RELATED APPLICATIONS

This patent application is the U.S. national stage of International Patent Application No. PCT/EP2010/070065, filed Dec. 17, 2010, which claims the benefit of European Patent Application No. 09179800.9, filed Dec. 18, 2009, and of U.S. Provisional Patent Application No. 61/287,714, filed Dec. 18, 2009, the disclosures of which are herein incorporated by reference.

TECHNICAL FIELD

This invention relates to security films containing a laser markable layer and security documents containing them.

BACKGROUND ART

Laser marking and laser engraving are well-known techniques which are frequently used in preparing identification cards and security documents. However in literature, laser engraving is often incorrectly used for laser marking. In laser marking, a colour change is observed by the local heating of material causing carbonization. Gray shades can be obtained by varying the beam power. In laser engraving, the material is removed by ablation.

It is frequently mentioned in the literature that polycarbonate, PBT and ABS as polymers are laser-markable as such, i.e. in the absence of a so-called "laser additive". However, laser additives are often added even in the case of these polymers in order to improve the laser markability further. A laser additive is a compound absorbing light at the wavelength of the laser used, usually at 1064 nm (Nd:YAG), and converting it to heat.

Carbon black can be used as a laser additive, however carbon black has a degree of colour which is sufficient to be visible prior to application of the laser beam and that can be unsightly or interfere with the distinctness of the mark after the laser beam has been applied. These disadvantages lead to a search for more efficient "colourless" laser additives. For example, U.S. Pat. No. 6,693,657 (ENGELHARD CORP) discloses a YAG laser marking additive based on a calcined powder of co-precipitated mixed oxides of tin and antimony which will produce a black mark contrasting with the surrounding area when exposed to YAG laser energy but prior thereto does not impart an appreciable colour to the surrounding area or cause a significant change in the performance of the material in which it has been added. Generally, the alternative laser additives are based on heavy metals making them less desirable from an ecological viewpoint.

Today, the most common plastic used in laser marking identification cards and security documents is a foil of extruded polycarbonate. However, polycarbonate foils have a number of disadvantages. The most important ones are their brittleness, leading to security cards getting broken when bended, and their lack of inertness towards organic solvents, opening possibilities to falsify a security card.

Polyethylene terephthalate (PET) exhibits a high solvent resistance, a high flexibility and is less expensive than polycarbonate, but exhibits no or very poor laser markability.

EP 866750 A (SCHREINER ETIKETTEN) discloses laser-markable films for labels based on a white PET film which bears a black coating. Laser irradiation ablates the black coating and uncovers the white background. This structure enables good high-contrast white-on-black inscriptions and drawings.

U.S. Pat. No. 7,541,088 (MITSUBISHI POLYESTER FILM) discloses a biaxially oriented, heat-set, at least two-layer coextruded film formed from polyethylene terephthalate (PET) or polyethylene 2,6-naphthalate (PEN) including a base layer and at least one outer layer. The base layer includes a white pigment and a laser absorber which has been coated with a carbonizing polymer. It is disclosed at col.3, lines 64-66 that only the combination of the laser marking additive with a white pigment and with a specific coextruded layer structure leads to effective laser marking. The opaque coextruded layer structure prevents any security print, such as e.g. guilloches, present on a foil beneath to be visible through the laser markable layer structure.

EP1852270 (TECHNO POLYMER) discloses a laminate for laser marking comprising: a layer A comprising a multicolor developing laser marking thermoplastic polymer composition capable of producing markings having two or more different color tones by irradiating thereto two or more laser lights having different energies from each other, the composition satisfying the following requirements (1) and (2): (1) comprising a chromatic colorant, a black substance capable of being dissipated by itself or discolored when exposed to the laser lights, and a thermoplastic polymer at the following mixing ratio, and (2) containing the chromatic colorant and the black substance in amounts of from 0.001 to 3 parts by weight and from 0.01 to 2 parts by weight, respectively, on the basis of 100 parts by weight of the thermoplastic polymer; and a layer B formed on at least one surface of the layer A, the layer B comprising a transparent thermoplastic resin, and exhibiting a light transmittance of not less than 70% as a single layer.

EP792756 (NIPPON KAYAKU) discloses a laser marking article having a cured film of a liquid composition comprising an energy beam-curable resin, a leuco dye and a developer and has a viscosity of not more than 20 cps as measured by an E type viscometer at 60° C.

Laser markable security films prepared by coating a laser markable layer on a support offer a number of advantages. In manufacturing these films, changes to the laser markable layer, e.g. in composition and thickness, or addition of other layers, e.g. a specific adhesion layer, can be implemented much easier than by an extrusion process. However, a number of physical properties, which are guaranteed by an (co)extrusion process, are not self evident for coated layers. There is a need for laser markable security films prepared by coating, which exhibit good physical properties for curl, adhesion and cracks on bending.

DISCLOSURE OF INVENTION

Summary of Invention

In order to overcome the problems described above, preferred embodiments of the present invention provide a security film as defined herein.

The security film also allowed a surprisingly simple way to include security print and printed data on the inside of a security document to be readable through a laser markable layer thereby making falsification very difficult.

Further advantages and embodiments of the present invention will become apparent from the following description.

BRIEF DESCRIPTION OF DRAWINGS

In the drawings FIG. 1 to FIG. 4 the following numbering is adhered to:

1, 1', 6=support, preferably PET-C;

2, 2'=subbing layer (SL);

3, 3'=laser markable layer (LML);

4, 4', 9=thermo adhesive layer (TAL)

5=opaque core e.g. white PETG;

7=adhesive layer;

8=transparent PETG; and 10, 10', 10"=security print & printed information.

Figure 1:
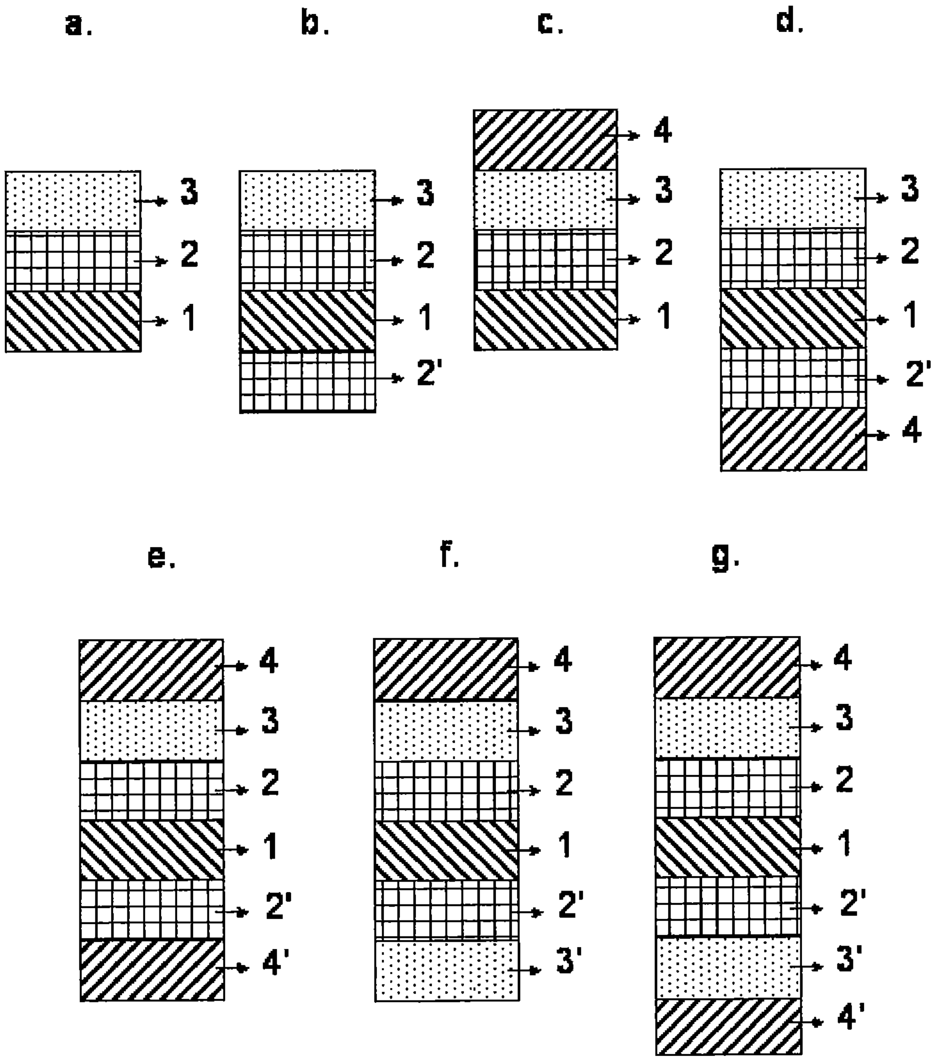

FIG. 1 shows examples of possible layer structures of the security film according to the present invention.

Figure 2:
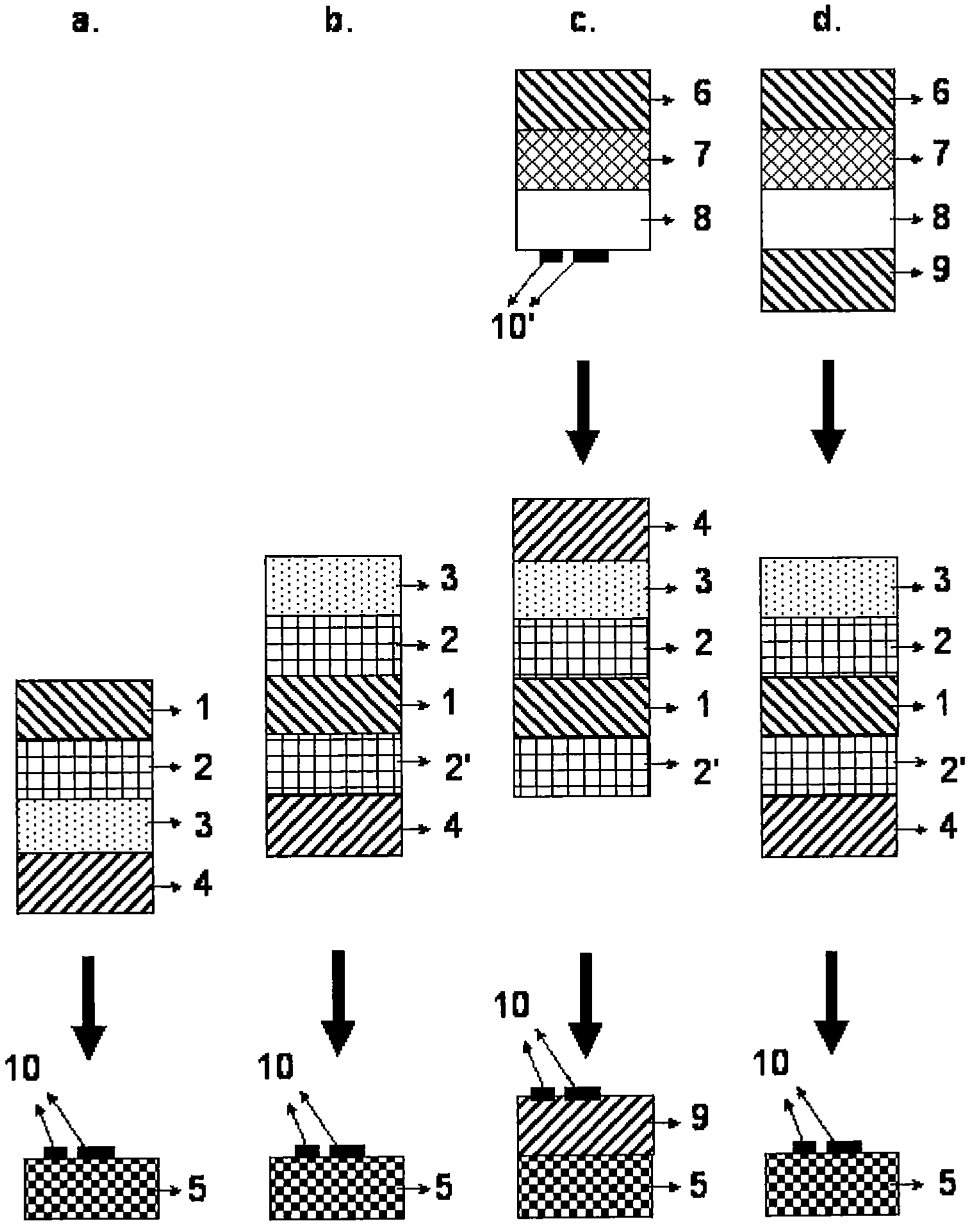

FIG. 2 shows how the security films of the invention can be used for manufacturing security documents.

Figure 3:
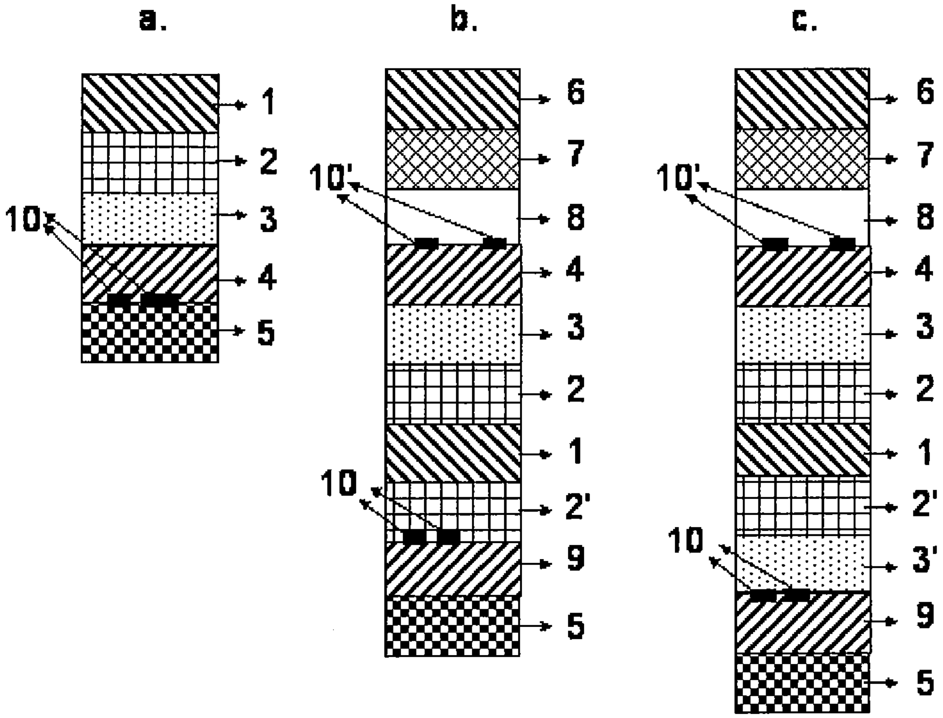

FIG. 3 shows examples of single side laser markable security documents.

Figure 4:
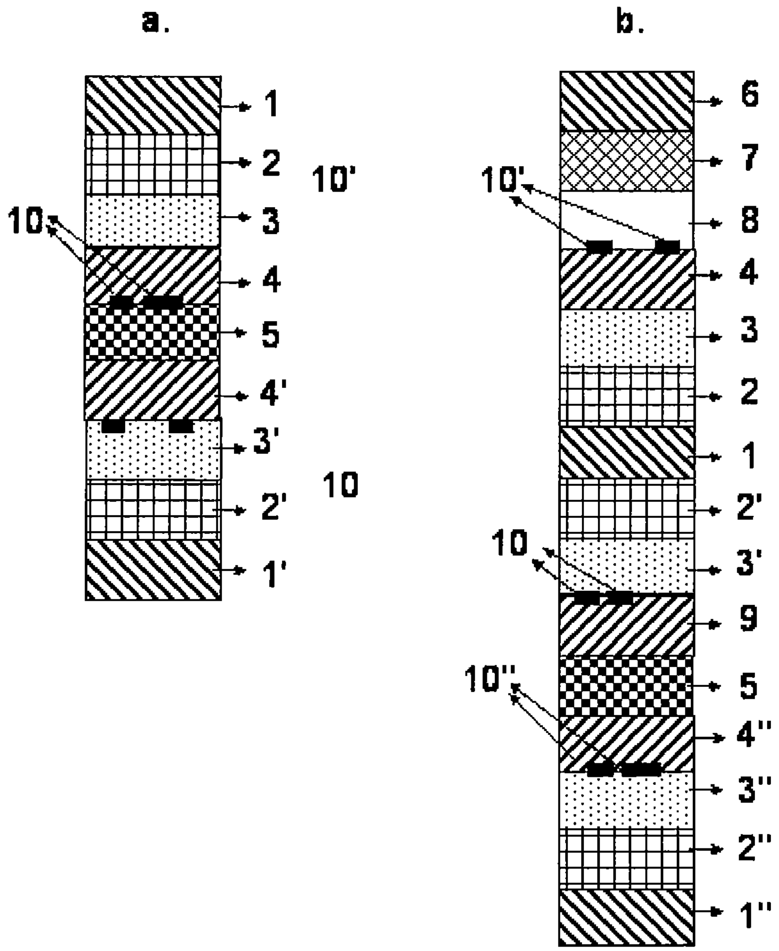

FIG. 4 shows examples of double side laser markable security documents.

DEFINITIONS

The terms "support" and "foil", as used in disclosing the present invention, mean a self-supporting polymer-based sheet, which may be associated with one or more adhesion layers e.g. subbing layers. Supports and foils are generally manufactured through extrusion.

The term "layer", as used in disclosing the present invention, is considered not to be self-supporting and is manufactured by coating it on a support or a foil.

"PET" is an abbreviation for polyethylene terephthalate.

"PETG" is an abbreviation for polyethylene terephthalate glycol, the glycol indicating glycol modifiers which are incorporated to minimize brittleness and premature aging that occur if unmodified amorphous polyethylene terephthalate (APET) is used in the production of cards.

"PET-C" is an abbreviation for crystalline PET, i.e. a biaxially stretched polyethylene terephthalate. Such a polyethylene terephthalate support has excellent properties of dimensional stability.

The definitions of security features correspond with the normal definition as adhered to in the "Glossary of Security Documents—Security features and other related technical terms" as published by the Consilium of the Council of the European Union on Aug. 25, 2008 (Version: v.10329.02.b.en) on its website: http://www.consilium.europa.eu/prado/EN/glossaryPopup.html.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methylbutyl etc.

The term "chlorinated ethylene", as used in disclosing the present invention, means ethylene substituted with at least one chlorine atom e.g. vinyl chloride, vinylidene chloride, 1,2-dichloro-ethylene, trichloroethylene and tetrachloroethylene. 1,2-dichloro-ethylene, trichloroethylene and tetrachloroethylene Trichloroethylene and tetrachloroethylene are all much more difficult to polymerize than vinyl chloride or vinylidene chloride.

Security Films

A security film according to the present invention includes a support and a laser markable layer, wherein the laser markable layer includes:

i) a laser additive;

ii) a polymer selected from the group consisting of polystyrene, polycarbonate and styrene acrylonitrile;

iii) a initiator; and iv) at least 15 wt % of radiation curable compound based on the total dry weight of the laser markable layer, wherein the radiation curable compound has a viscosity of less than 100 mPa·s at 25° C. and at a shear rate of 100 $s^{-1}$.

In a preferred embodiment of the security film, the support is a biaxially oriented polyethylene terephthalate support, preferably foreseen with a subbing layer.

In one embodiment of the security film, the support is transparent. This allows security print and printed data on the inside of a security document to be readable through the laser markable layer of the security film thereby making falsification very difficult. Such a configuration is shown in it simplest form in FIG. 1.*a*, wherein a laser markable layer 3 was coated on the subbing layer 2 present on the PETC-support SUP. The layer configurations shown in the FIGS. 1 to 4 are merely illustrative. For example, a second subbing layer may present between the subbing layer 2 and the laser markable layer 3 in FIG. 1.*a*, or, for example, the laser markable layer may be split up in two laser markable layers having the same or a different composition, e.g. a different content of laser additive.

In a preferred embodiment of the security film, the polymer in the laser markable layer LML is polystyrene. It was observed that polystyrene in coated layers led to higher optical densities on laser marking than e.g. polycarbonate and styrene acrylonitrile.

In a preferred embodiment of the security film, the radiation curable compound is an (meth)acrylate, more preferably an acrylate and most preferably hexanediol diacrylate and/or alkoxylated hexanediol diacrylate.

In a preferred embodiment of the security film, the laser additive is carbon black. The carbon black preferably has an average particle size of less than 100 nm. The laser additive is preferably present in amount of less than 0.08 wt % based on the total weight of laser markable polymer(s).

The security film may, as shown by FIG. 1.*c*, further contain a thermo adhesive layer TAL (4) on top of the laser markable layer LML (3).

In one embodiment, the security film further contains a second subbing layer SL2 (e.g. 2' in FIG. 1.*b*) on the support SUP on the other side of the support SUP than the side having the subbing layer SL1 (2), and may have a thermo adhesive layer TAL (e.g. 4 in FIG. 1.*d*) on top of the subbing layer SL2 (2').

The thermo adhesive layer TAL preferably contains a copolymer of vinylchloride, vinylacetate and vinylalcohol.

In a preferred embodiment of the security film, the polyethylene terephthalate support SUP has a thickness of 100 μm or less.

In another preferred embodiment, the security film contains a second laser markable layer present on the other side of the support SUP than the side having the laser markable layer LML. This configuration is shown by FIGS. 1.*f* and 1.*g* wherein two laser markable layers 3 and 3' were coated on subbing layers 2 respectively 2' present on both sides of the PETC support 1. A thermo adhesive layer (4,4') may be present on one or both of the laser markable layers.

A method for preparing a security film as defined by any one of claims 1 to 10 comprising the steps of:

a) providing a transparent biaxially oriented polyethylene terephthalate support having a subbing layer; and b) coating a laser markable layer on the subbing layer using a composition including:

i) a laser additive;

ii) a polymer selected from the group consisting of polystyrene, polycarbonate and styrene acrylonitrile;

iii) a initiator; and iv) at least 15 wt % of radiation curable compound based on the total dry weight of the laser markable layer, wherein the radiation curable compound has a viscosity of less than 100 mPa·s at 25° C. and at a shear rate of 100 $s^{-1}$.

Security Documents

A security document according to the present invention includes al least one security film according to the present invention. Such a security document can be used for identification of the person mentioned on the security document.

FIG. 2 shows how security documents having one or more laser markable layers on one side of the opaque core 5 can be prepared using the security film according to the present invention. Possible results of single side laser markable security documents prepared by a lamination as shown by FIG. 2 are shown in FIG. 3. FIG. 4 shows examples of double side laser markable security documents which can be symmetrical (FIG. 4.*a*) or asymmetrical (FIG. 4.*b*) in view of the opaque core 5. The opaque core is preferably a white or light coloured foil, e.g. opaque PETG, on which the dark laser markings are clearly visible.

In FIG. 2.*a*, the security film of FIG. 3.*c* is laminated with the thermo adhesive layer 4 onto an opaque core 5 containing some security print 10, e.g. guilloches. It is also possible to have the laser markable layer 3 as the outermost layer by laminating the security film of FIG. 1.*d* with the thermo adhesive layer 4 onto an opaque core 5 containing some security print 10. Alternatively the laser markable layer 3 may also be protected by an overlay, preferably having PETC (6) as an outermost foil as shown in FIGS. 2.*c* and 2.*d*. For lamination of this overlay, a thermo adhesive layer is preferably present on either the laser markable layer (4 in FIG. 2.*c*) or the overlay (9 in FIG. 2.*d*). The overlay may contain further layers or foils, e.g. a subbing layer 7 and a transparent PETG foil 8, and optionally contain some security print or printed information 10', for example printed by inkjet or thermal dye sublimation.

An advantage of the transparent support 1 in the security film is that security print 10 on an opaque core 5 is visible through the laser markable layer 3, as shown e.g. in FIGS. 3.*a* and 3.*b*. In FIG. 3.*c*, two laser markable layers 3 and 3' are present in the security document. It has also been observed that higher optical densities are created by laser marking in the laser markable layer which is the nearest to an opaque layer or foil, such as e.g. the opaque core 5. By controlling the thickness of the support SUP (1) in the security film, a ghost image can be created in the laser markable layer 3 of the security document of FIG. 3.*c*.

In a preferred embodiment, the security document contains a white support or layer, preferably in close contact with the security film, more preferably in contact with the laser markable layer LML. An adhesive layer, preferably a thermo adhesive layer TAL, may be present between the white support or layer and the laser markable layer LML.

The security documents may also be laser markable on both sides of the core 5 as shown in FIG. 4, by including laser markable layers (3, 3', 3") on both sides of the opaque core 5. Security print and printed information (10, 10', 10") can be present in or on different layers and foils on both sides of the opaque core 5.

The security document may be a "smart card", meaning an identification card incorporating an integrated circuit as a so-called electronic chip. In a preferred embodiment the security document is a so-called radio frequency identification card or RFID-card.

The security document is preferably an identification card selected from the group consisting of an identity card, a security card, a driver's licence card, a social security card, a membership card, a time registration card, a bank card, a pay card and a credit card. In a preferred embodiment, the security document is a personal identity card.

The security document preferably has a format as specified by ISO 7810. ISO 7810 specifies three formats for identity cards: ID-1 with the dimensions 85.60 mm×53.98 mm, a thickness of 0.76 mm is specified in ISO 7813, as used for bank cards, credit cards, driving licences and smart cards; ID-2 with the dimensions 105 mm×74 mm, as used in German identity cards, with typically a thickness of 0.76 mm; and ID-3 with the dimensions 125 mm×88 mm, as used for passports and visa's. When the security cards include one or more contact less integrated circuits then a larger thickness is tolerated, e.g. 3 mm according to ISO 14443-1.

To prevent forgeries of security documents, different means of securing are used. One solution consists in superimposing lines or guilloches on an identification picture such as a photograph. In that way, if any material is printed subsequently, the guilloches appear in white on added black background. Other solutions consist in adding security elements such as information printed with ink that reacts to ultraviolet radiation, micro-letters concealed in an image or text etc.

The security document according to the present invention may contain other security features such as anti-copy patterns, guilloches, endless text, miniprint, microprint, nanoprint, rainbow colouring, 1D-barcode, 2D-barcode, coloured fibres, fluorescent fibres and planchettes, fluorescent pigments, OVD and DOVID (such as holograms, 2D and 3D holograms, Kinegrams™, overprint, relief embossing, perforations, metallic pigments, magnetic material, Metamora colours, microchips, RFID chips, images made with OVI (Optically Variable Ink) such as iridescent and photochromic ink, images made with thermochromic ink, phosphorescent pigments and dyes, watermarks including duotone and multitone watermarks, ghost images and security threads.

A combination with one of the above security features increases the difficulty for falsifying a security document.

Supports

The support of the security film according to the present invention is preferably a PET-C support. Such a biaxially stretched polyethylene terephthalate support has excellent properties of dimensional stability, organic solvent resistance and flexibility The manufacturing of polyester supports is well-known in the art of preparing suitable supports for silver halide photographic films. For example, GB 811066 (ICI) teaches a process to produce biaxially oriented films.

The support of the security film according to the present invention should be sufficiently thick to be self-supporting, but thin enough to be flexed, folded or creased without cracking. Preferably, the support has a thickness of between about 10 μm and about 200 μm, more preferably between about 10 μm and about 100 μm, most preferably between about 30 μm and about 65 μm.

In a preferred embodiment, PET-C is also used for the core of a security document, in which case it is preferably opaque.

Subbing Layers

In the present invention, the support may be combined with a subbing layer. A PET-C support is preferably provided with a subbing layer containing a polymer based on a polyester, a polyester-urethane or a copolymer of a chlorinated ethylene, more preferably based on vinylidene chloride. Preferably at least 25 wt %, more preferably at least 30% and most preferably at least 45 wt % of vinylidene chloride monomer is present in the polymer based on the total weight of the polymer.

The application of subbing layers is well-known in the art of manufacturing polyester supports for silver halide photographic films. For example, the preparation of such subbing layers is teached by U.S. Pat. No. 3,649,336 (AGFA) and GB 1441591 (AGFA).

The step of biaxially stretching the polyethylene terephthalate support is preferably performed with the subbing layer contiguous with the polyethylene terephthalate support during at least part of the biaxial stretching process. The preferred stretching process includes the steps of: longitudinally stretching the polyethylene terephthalate support; applying a composition comprising a polyester, a polyester-urethane or a copolymer of a chlorinated ethylene to the longitudinally-stretched polyethylene terephthalate support to provide a subbing layer of the composition contiguous with the longitudinally-stretched polyethylene terephthalate support; and transversally stretching the longitudinally-stretched polyethylene terephthalate support.

Suitable vinylidene chloride copolymers include: the copolymer of vinylidene chloride, N-tert.-butylacrylamide, n-butyl acrylate, and N-vinyl pyrrolidone (e.g. 70:23:3:4), the copolymer of vinylidene chloride, N-tert.-butylacrylamide, n-butyl acrylate, and itaconic acid (e.g. 70:21:5:2), the copolymer of vinylidene chloride, N-tert.-butylacrylamide, and itaconic acid (e.g. 88:10:2), the copolymer of vinylidene chloride, n-butylmaleimide, and itaconic acid (e.g. 90:8:2), the copolymer of vinyl chloride, vinylidene chloride, and methacrylic acid (e.g. 65:30:5), the copolymer of vinylidene chloride, vinyl chloride, and itaconic acid (e.g. 70:26:4), the copolymer of vinyl chloride, n-butyl acrylate, and itaconic acid (e.g. 66:30:4), the copolymer of vinylidene chloride, n-butyl acrylate, and itaconic acid (e.g. 80:18:2), the copolymer of vinylidene chloride, methyl acrylate, and itaconic acid (e.g. 90:8:2), the copolymer of vinyl chloride, vinylidene chloride, N-tert.-butylacrylamide, and itaconic acid (e.g. 50:30:18:2). All the ratios given between brackets in the above-mentioned copolymers are ratios by weight.

In a preferred embodiment of the security film according to the present invention, the subbing layer has a dry thickness of no more than 2 μm or 200 mg/m$^2$.

Laser Markable Layers

The optional transparency of a security film according to the present invention and the small thickness of the laser markable layers are important advantages which open up more options for composing the layer configuration of a security document, e.g. applying security print between the core and the laser markable layer. Commercially available laser markable foils, such as the most commonly used polycarbonate foils, have a thickness of at least 50 μm, while in the security film according to the present invention the thickness of the laser markable layer may surprisingly be even less than 25 μm and then still capable of delivering sufficient optical density. The combination of the laser markable layer with a PETC support brings the further advantages of solvent resistance and flexibility, which are two major shortcomings of polycarbonate foils.

The polymers suitable for laser marking, i.e. carbonization, usually include polycarbonate (PC), polybutylene terephthalate (PBT), polyvinyl chloride (PVC), polystyrene (PS) and copolymers thereof, such as e.g. aromatic polyester-carbonate and acrylonitrile butadiene styrene (ABS). However, in order to obtain a sufficient optical density by laser marking in the relatively thin laser markable layers of the security film according to the present invention, it was found that only a few polymers were suitable and that the presence of a laser additive was imperative.

The polymer suitable for laser marking of the security film according to the present invention is selected from the group consisting of polystyrene, polycarbonate and styrene acrylonitrile. A mixture of two or more of these polymers may also be used.

In a preferred embodiment of the security film according to the present invention, the laser markable layer contains polystyrene. Polystyrene was observed to deliver the highest optical densities by laser marking and also exhibited the highest laser sensitivity.

Laser markable layers based on styrene acrylonitrile polymers are sometimes considered less safe since toxic acrylonitrile may be released during laser marking.

The colour change in the polymeric materials is accelerated by the addition of a "laser additive", a substance which absorbs the laser light and converts it to heat.

Suitable laser additives include antimony metal, antimony oxide, carbon black, mica (sheet silicate) coated with metal oxides and tin-antimony mixed oxides. In WO 2006/042714, the dark coloration of plastics is obtained by the use of additives based on various phosphorus-containing mixed oxides of iron, copper, tin and/or antimony.

Suitable commercially available laser additives include mica coated with antimony-doped tin oxide sold under the trade name of Lazerflair™ 820 and 825 by MERCK; copper hydroxide phosphate sold under the trade name of Fabulase™ 322 by BUDENHEIM; aluminium heptamolybdate sold under the trade name of AOM™ by HC STARCK; and antimony-doped tin oxide pigments such as Engelhard Mark-It™ sold by BASF.

In a preferred embodiment of the security film according to the present invention, the laser markable layer contains carbon black particles. This avoids the use of heavy metals in manufacturing these security documents. Heavy metals are less desirable from an ecology point of view and may also cause problems for persons having a contact allergy based on heavy metals.

Suitable carbon blacks include Special Black 25, Special Black 55, Special Black 250 and Farbruss™ FW2V all available from EVONIK; Monarch™ 1000 and Monarch™ 1300 available from SEPULCHRE; and Conductex™ 975 Ultra Powder available from COLUMBIAN CHEMICALS CO.

The use of carbon black pigments as laser additives may lead to an undesired background colouring of the security document precursor. For example, a too high concentration of carbon black in a laser markable layer in security document having a white background leads to grey security documents. A too low concentration of carbon black slows down the laser marking or requires a higher laser power leading to undesirable blister formation. Both problems were solved in the present invention by using carbon black particles having a small average particle size and present in a low concentration.

The numeric average particle size of the carbon black particles is preferably smaller than 300 nm, preferably between 5 nm and 250 nm, more preferably between 10 nm and 100 nm and most preferably between 30 nm and 60 nm. The average particle size of carbon black particles can be determined with a Brookhaven Instruments Particle Sizer BI90plus based upon the principle of dynamic light scattering. The measurement settings of the BI90plus are: 5 runs at 23° C., angle of 90°, wavelength of 635 nm and graphics=correction function.

For avoiding grey background colouring of security document, carbon black is preferably present in a concentration of less than 0.08 wt %, more preferably present in a concentration of less than 0.08 wt %, and most preferably present in the range 0.01 to 0.03 wt %, all based on the total weight of the laser markable polymer(s).

Adhesive Layers

In manufacturing security documents, hot lamination is the most common lamination method used and is generally preferred over cold lamination. Hot laminators use a heat-activated adhesive that is heated as it passes through the laminator. The downside to hot laminators is that a thermosensitive layer may not be capable to handle the heat required to apply the lamination. Cold laminators use a pressure-sensitive adhesive that does not need to be heated. The laminator uses rollers that push the sheets of lamination together. Cold laminators are faster and easier to use than hot laminators, and do not cause discoloration of thermosensitive layers.

The lamination temperature to prepare security documents according to the present inventions is preferably no higher than 180° C., more preferably no higher than 170° C. and most preferably no more than 160° C.

In the security films shown in FIGS. 1 to 4 each time a thermo adhesive layer was used, however nothing prevents the use of a pressure-sensitive adhesive layer or foil instead of the thermo adhesive layer in any of the embodiments shown by FIGS. 1 to 4. A combination of pressure-sensitive and thermo sensitive adhesive layers and foils may also be used in the security films and security documents according to the present invention.

Suitable compositions for these pressure-sensitive and thermo sensitive adhesive layers and foils in the security films and security documents according to the present invention are well-known to one skilled in the art.

A preferred hot melt foil which is positioned e.g. between the security film and an opaque core just prior to lamination is a polyurethane foil.

Contrary to biaxially oriented polyethylene terephthalate, a non-oriented PETG layer or foil softens rapidly near the glass transition temperature and can thus also be used for adhesive purposes as illustrated, for example, in US 2009032602 (TOYO BOSEKI).

Suitable thermo adhesive compositions are also disclosed in WO 2009/063058 (AGFA), A preferred thermo adhesive layer is based on a hydroxyl-functional, partially-hydrolyzed vinyl chloride/vinyl acetate resin available under the trade name of UCAR™ VAGD Solution vinyl resin from Dow Chemical Company.

Polymeric Overlays

The security document according to the present invention preferably has at least one polymer overlay on top of the laser markable layer. The security document may have several polymeric overlays on top of each other, for example, each containing some security features or information applied by imaging techniques such as ink-jet printing, intaglio printing, screen printing, flexographic printing, driographic printing, electrophotographic printing, electrographic printing, embossing and offset printing.

Suitable polymeric overlays which are laminated or coated include cellulose acetate propionate or cellulose acetate butyrate, polyesters such as polyethylene terephthalate and polyethylene naphthalate, polyamides, polycarbonates, polyimides, polyolefins, poly(vinylacetals), polyethers and polysulphonamides.

In a preferred embodiment of the security document according to the present invention, the polymeric overlay is polyvinyl chloride, polycarbonate or polyester. The polyester is preferably polyethylene terephthalate (PET) or polyethylene terephthalate glycol (PETG), more preferably PET-C.

EXAMPLES

Materials

All materials used in the following examples were readily available from standard sources such as ALDRICH CHEMICAL CO. (Belgium) and ACROS (Belgium) unless otherwise specified. The "water" used in the example was deionized water.

SPECIAL BLACK 25 is a carbon black having a primary particle size of about 56 nm and BET Surface area of 45 $m^2/g$, available from EVONIK. MEK is an abbreviation used for methylethylketon.

CN3102 is an oligomer blend containing aliphatic urethane acrylate and 2-(2-ethoxyethoxy)ethylacrylate esters available as Sartomer™ CN3102 from SARTOMER.

CN2505 is a tetrafunctional polyester acrylate available as Craynor™ CN2505 from SARTOMER.

SR295 is pentaerythritoltetraacrylate available as Sartomer™ SR295 from SARTOMER.

SR238 is 1,6 hexanediol diacrylate 1,6 available as Sartomer™ SR238 from SARTOMER.

SR349 is ethoxylated (3) bisphenol A diacrylate available as Sartomer™ SR349 from SARTOMER.

SR610 is polyethyleneglycol (600) diacrylate available as Sartomer™ SR610 from SARTOMER.

CD561 is alkoxylated hexanediol diacrylate sold under the trade name of Sartomer™ CD561 from SARTOMER.

PC01 is an abbreviation used for polycarbonate Apec™ 2050 available from BAYER.

PS02 is an abbreviation used for Empera™171M, a polystyrene available from INEOS.

SAN01 is an abbreviation used for a styrene-acrylonitrile copolymer available as DOW XZ 9518600 from DOW CHEMICAL. A 10% solution of this polymer in MEK has a viscosity of 7.1 mPa·s at 22° C.

PV01 is an abbreviation used for the polyvinyl butyral polymer S LEC™ BL 5 HP available from SEKISUI.

PC01-sol is 20 wt % solution of PC01 in MEK.

PS01-sol is 20 wt % solution of PS01 in MEK.

PS02-sol is 30 wt % solution of PS01 in MEK.

SAN01-sol is 20 wt % solution of SAN01 in MEK.

PV01-sol is 20 wt % solution of PC01 in MEK.

I819 is phenyl(2,4,6-trimethylbenzoyl)phosphino oxide sold under the trade name of Irgacure™ 819 by CIBA SPECIALTY CHEMICALS.

TPO is an abbreviation used for a 10 wt % solution in MEK of 2,4,6-trimethylbenzoyl-diphenyl-phosphineoxide available under the trade name Darocur™ TPO from CIBA SPECIALTY CHEMICALS.

Bayhydrol™ UH2558 is a cosolvent free aliphatic anionic polyurethane dispersion (containing ca 37.2% solid) based on a polyester urethane of isoforondiisocyanate, hexanediol and adipinic acid from BAYER.

Paresin is a dimethyltrimethylolmelamine formaldehyde resin available under the trade name PAREZ™ RESIN 613 from American Cyanamid Company.

DR274 is a 10% aqueous solution of copolymer of 60% poly(methylsilylsesquixane)silylepoxy 60/40 available as TOSPEARL™ 120 from GENERAL ELECTRIC.

DR270 is an aqueous solution containing 2.5 wt % of DOWFAX™ 2A1 and 2.5 wt % of Surfynol™ 420.

BS is an abbreviation used for a 10 wt % solution in MEK of the silicon oil Baysilon™ OI A available from BAYER and used as a surfactant.

Zylar™ 631 is a copolymer of styrene, butadiene and methyl methacrylate from INEOS NOVA SERVICES BV.

UCAR™ VAGD is a 90/4/6 wt % copolymer of vinylchloride/vinylacetaat/vinylalcohol available from UNION CARBIDE.

PEDOT/PSS is a 1.2% aqueous dispersion of poly(3,4-ethylene-oxythiophene)/poly(styrene sulphonic acid) (1:2.46 by weight) produced as described in U.S. Pat. No. 5,354,613 (AGFA).

VIN1 is a 30 wt % solution in water of a copolymer of vinylidene chloride, methyl acrylate and itaconic acid (88:10:2 by weight).

Kelzan™ S is a xanthan gum from MERCK & CO., Kelco Division, USA, which according to Technical Bulletin DB-19 is a polysaccharide containing mannose, glucose and glucuronic repeating units as a mixed potassium, sodium and calcium salt.

Zonyl™ FS0100 is a fluorosurfactant, more specific a block copolymer of polyethyleneglycol and polytetrafluoroethylene with the structure: $F(CF_2CF_2)_yCH_2CH_2O(CH_2CH_2O)_xH$, where x=0 to ca. 15 and y=1 to ca. 7 from DUPONT.

Poligen™ WE7 is a 40% aqueous latex of oxidized polyethylene from BASF.

PMMA is a 20% dispersion of 0.1 μm diameter polymethylmethacrylate spherical particles.

KIESELSOL™ 100F is a 36% aqueous dispersion of colloidal silica available from BAYER.

Liofol™ UK 3640 is a polyurethane solvent (ethyl acetate) adhesive from Henkel.

Liofol™ UK 6800 is a hardener from Henkel for use with Liofol™ UK 3640.

MERSOLAT™ H is 76% aqueous paste of a sodium pentadecyl-sulfonate from BAYER.

Mersol is a 0.6% solution of MERSOLAT™ H in water.

Mitsubishi White PET is a 75 μm white PET support WO175D027B available from MITSUBISHI.

Opaque PETG core is a 500 μm opaque PETG core.

DOWFAX™ 2A1 is a surfactant (CASRN 12626-49-2) from DOW CHEMICAL.

Surfynol™ 420 is a 2,4,7,9-Tetramethyl-5-decyne-4,7-diol-bispolyoxyethylene ether surfactant from AIR PRODUCTS & CHEMICALS.

Measurement Methods

1. Optical Density

The optical density was measured in reflection using a spectrodensitometer Type 504 from X-RITE using a visual filter.

2. Curl

A coated sample which curls is put on a flat table and the distance between the table surface and the edge of the sample is measured. The larger the distance measured in mm was, the higher the curl of the coated sample was. If the edge curls to a direction perpendicular to the table or further, the indication "n.m." (=not measureable) is used.

3. Viscosity

The viscosity of the coating compositions was measured using a Brookfield DV-II+ viscometer at 25° C. at 6 RPM.

4. Blisters

When an overlay is positioned on a laser markable layer, upon laser marking the overlay may come loose from the laser markable layer due to the formation of gases, e.g. $CO_2$ and gases of residual solvent in the laser markable layer, thereby causing blisters mainly in a Dmax area. These blisters are visible by the naked eye.

5. Adhesion

The adhesion was evaluated by cutting the coated layer loose from the support at the corner of a coated sample, applying a piece of a Tesatape™ 4104 PVC tape and pulling the tape away from the corner in the direction of the opposite corner of the coated sample. If (part of) the coated layer comes of with the tape, then the adhesion is considered insufficient ("Not OK"), in the alternative case the adhesion is considered to be sufficient ("OK").

Example 1

This example illustrates the influence of the viscosity of a radiation curable compound on physical properties, such as curl and blister formation.

Preparation of Laser Additive Dispersion LADPC 5 g of the pigment Special Black™ 25 and 20 g of the polycarbonate polymer PC01 were mixed using a dissolver in 75 g of the organic solvent MEK. The mixture was milled in a roller mill using steatite-beads of 1 cm diameter for seven days at a rotation speed set at 150 rpm. After milling, the dispersion was separated from the beads using a filter cloth and further diluted with a polycarbonate solution PC01-sol in order to obtain the laser additive dispersion LADPC containing 2,000 ppm of the carbon black pigment versus the polymer.

Preparation of Laser Additive Dispersion LADPV

The laser additive dispersion LADPV was made in exactly the same manner as LADPC except that the polycarbonate polymer PC01 was replaced by polyvinylbutyral PV01.

Preparation of Security Films

The comparative coating compositions COMP-1 to COMP-6 and the inventive coating compositions INV-1 and INV-2 were prepared by mixing the components according to Table 1.

TABLE 1

| | Coating compositions | | | | | | | | |
|---|---|---|---|---|---|---|---|---|---|
| wt % of | COMP-1 | COMP-2 | COMP-3 | COMP-4 | COMP-5 | COMP-5 | INV-1 | INV-2 | INV-3 |
| LADPC | 2.5 | — | 2.5 | 2.5 | 2.5 | 2.5 | 2.5 | 2.5 | 2.5 |
| LADPV | — | 2.5 | — | — | — | — | — | — | — |
| PS01-sol | 97.5 | — | 63.5 | 63.5 | 63.5 | 63.5 | 63.5 | 63.5 | 63.5 |
| PV01-sol | — | 97.5 | | | | | | | |
| CN3102 | — | — | 6.6 | — | — | — | — | — | — |
| CN2505 | — | — | — | 6.6 | — | — | — | — | — |
| SR295 | — | — | — | — | 6.6 | — | — | — | — |
| SR349 | — | — | — | — | — | 6.6 | — | — | 3.3 |
| SR238 | — | — | — | — | — | — | 6.6 | — | 3.3 |
| SR610 | — | — | — | — | — | — | — | 6.6 | — |
| I819 | — | — | 0.2 | 0.2 | 0.2 | 0.2 | 0.2 | 0.2 | 0.2 |
| MEK | — | — | 27.2 | 27.2 | 27.2 | 27.2 | 27.2 | 27.2 | 27.2 |

The coating compositions COMP-1 to COMP-6 and INV-1 to INV-3 were each coated at a wet coating thickness of 100 μm on a Mitsubishi White PET support using the Elcometer Bird Film Applicator (from ELCOMETER INSTRUMENTS) and subsequently dried for 15 minutes at 50° C.

All coated samples were cured using a Fusion DRSE-120 conveyer equipped with a Fusion VPS/1600 lamp (D-bulb) which transported the sample under the UV-lamp on a conveyer belt at a speed of 20 m/min for a UV exposure of 250 mJ/m$^2$.

Evaluation and Results

The curl and adhesion of each coated sample were evaluated. For evaluating the laser marking on the coated samples, first a 125 μm thick transparent, non-laser markable polycarbonate foil Makrofol™ DE 1-1 from BAYER was laminated onto the laser markable layer of each coated samples using an Oasys OLA6/7 laminator at a temperature setting of 205° C. The presence of an overlay prevents laser engraving to occur, i.e. the ablation of material by the laser which would lead to the measurement of a lower Dmax. After lamination, a test image containing a wedge with different grey-levels (six squares of 9×9 mm) was laser marked on all the coated samples using a Rofin RSM Powerline E laser (10 W) with settings 29 ampere and 22 kHz. The maximum optical density was measured in square 6 (RGB-values=12 of this area in the bitmap-image). The sensitivity for laser marking was evaluated by measuring the optical density in square 4. The results are shown in Table 2.

TABLE 2

| Coated Sample | Viscosity monomer (mPa · s) | Curl (mm) | Adhesion | Dmin | Sensitivity | Dmax |
|---|---|---|---|---|---|---|
| COMP-1 | — | 88 | OK | 0.13 | 0.84 | 1.63 |
| COMP-2 | — | 7 | OK | 0.13 | n.m. | 0.42 |
| COMP-3 | 180 | 62 | Not OK | 0.13 | 0.39 | 1.03 |
| COMP-4 | 700 | 43 | Not OK | 0.16 | 0.34 | 0.56 |
| COMP-5 | 342 | 34 | OK | 0.13 | 0.54 | 1.09 |
| COMP-6 | 1600 | 4 | Not OK | 0.13 | 0.64 | 1.34 |
| INV-1 | 9 | 0 | OK | 0.12 | 0.56 | 1.10 |
| INV-2 | 90 | 2 | OK | 0.12 | 0.31 | 0.58 |
| INV-3 | 9 and 1600 | 5 | OK | 0.18 | 0.87 | 1.23 |

From Table 2, it should be clear that minimal curl after drying for 15 minutes at 50° C. of the coating and good adhesion could only be obtained by using at least one monomer having a viscosity of less than 100 mPa·s at 25° C. and at a shear rate of 100 s$^{-1}$. However. Table 2 also shows that the nature of the monomer influences the sensitometry. An improved sensitivity and Dmax was obtained with hexanediol diacrylate compared to polyethyleneglycol 600 diacrylate. The coated and cured sample INV-3 shows that good physical properties and sensitometry can be obtained with a content of 16.5 wt % of hexanediol diacrylate based on the total dry weight of the laser markable layer. The comparative coating COMP-2 makes it clear that not all polymers known to be laser markable in extruded form also function as well when coated as a layer.

Example 2

This example illustrates the influence of the nature of the laser markable polymer and the content of a radiation curable compound on the sensitometry and the physical properties.

Preparation of Laser Additive Dispersions

The same laser additive dispersion LADPC as in EXAMPLE 1 was used Laser Additive Dispersion LADPS 5 g of the pigment Special Black™ 25 and 20 g of the polystyrene polymer PS01 were mixed using a dissolver in 75 g of the organic solvent MEK. The mixture was milled in a roller mill using steatite-beads of 1 cm diameter for seven days at a rotation speed set at 150 rpm. After milling, the dispersion was separated from the beads using a filter cloth and further diluted with a polystyrene solution PS01-sol in order to obtain the laser additive dispersion LADPS containing 2,000 ppm of the carbon black pigment versus the polymer.

Laser Additive Dispersion LADSAN 5 g of the pigment Special Black™ 25 and 20 g of the styrene acrylonitrile polymer SAN01 were mixed using a dissolver in 75 g of the organic solvent MEK. The mixture was milled in a roller mill using steatite-beads of 1 cm diameter for seven days at a rotation speed set at 150 rpm. After milling, the dispersion was separated from the beads using a filter cloth and further diluted with a styrene acrylonitrile solution SAN01-sol in order to obtain the laser additive dispersion LADSAN containing 2,000 ppm of the carbon black pigment versus the polymer.

Preparation of Security Films

The comparative coating compositions COMP-7 to COMP-12 and the inventive coating compositions INV-4 to INV-9 were prepared by mixing the components according to Table 3 and Table 4.

TABLE 3

| wt % of | COMP-7 | COMP-8 | COMP-9 | INV-4 | INV-5 | COMP-10 |
|---|---|---|---|---|---|---|
| LADSAN | 2.5 | — | — | 2.5 | 2.5 | 2.5 |
| LADPS | — | 2.5 | — | — | — | — |
| LADPC | — | — | 2.5 | — | — | — |
| SAN01-sol | 97.5 | — | — | 68.5 | 75.5 | 84.5 |
| PS01-sol | — | 97.5 | — | — | — | — |
| PC01-sol | — | — | 97.5 | — | — | — |
| SR238 | — | — | — | 5.6 | 4.2 | 2.4 |
| TPO | — | — | — | 0.2 | 0.2 | 0.2 |
| MEK | — | — | — | 23.2 | 17.6 | 10.4 |

TABLE 4

| wt % of | INV-6 | INV-7 | COMP-11 | COMP-12 | INV-8 |
|---|---|---|---|---|---|
| LADSAN | — | — | — | — | — |
| LADPS | 2.5 | 2.5 | 2.5 | — | — |
| LADPC | — | — | — | 2.5 | 2.5 |
| SAN01-sol | — | — | — | — | — |
| PS01-sol | 68.5 | 75.5 | 84.5 | — | — |
| PC01-sol | — | — | — | 84.5 | 68.5 |
| SR238 | 5.6 | 4.2 | 2.4 | 2.4 | 5.6 |
| TPO | 0.2 | 0.2 | 0.2 | 0.2 | 0.2 |
| MEK | 23.2 | 17.6 | 10.4 | 10.4 | 23.2 |

The coating compositions COMP-7 to COMP-12 and INV-4 to INV-8 were each coated at a wet coating thickness of 100 μm on a Mitsubishi White PET support using the Elcometer Bird Film Applicator (from ELCOMETER INSTRUMENTS) and subsequently dried for 15 minutes at 80° C.

All coated samples were cured using a Fusion DRSE-120 conveyer equipped with a Fusion VPS/1600 lamp (D-bulb) which transported the sample under the UV-lamp on a conveyer belt at a speed of 20 m/min for a UV exposure of 250 mJ/m$^2$.

Evaluation and Results

For evaluating the laser marking on the coated samples, first a 125 μm thick transparent, non-laser markable polycarbonate foil Makrofol™ DE 1-1 from BAYER was laminated onto the laser markable layer of each coated samples using an Oasys OLA6/7 laminator at a temperature setting of 205° C. The presence of an overlay prevents laser engraving to occur, i.e. the ablation of material by the laser which would lead to the measurement of a lower Dmax. After lamination, a test image containing a wedge with different grey-levels (six squares of 9×9 mm) was laser marked on all the coated samples using a Rofin RSM Powerline E laser (10 W) with settings 29 ampere and 22 kHz. The maximum optical density was measured in square 6 (RGB-values=12 of this area in the bitmap-image). The sensitivity for laser marking was evaluated by measuring the optical density in square 4. The curl and the presence of blisters after laser marking of each coated sample were also evaluated. The results are shown in Table 5 (n.m. means that curl was out of range for measurement).

TABLE 5

| Sample | wt % monomer | Curl (mm) | Blisters | $D_{min}$ | Sensitivity | $D_{max}$ |
|---|---|---|---|---|---|---|
| COMP-7 | 0 | 55 | Yes | 0.17 | 0.67 | 0.89 |
| COMP-8 | 0 | 85 | Yes | 0.16 | 1.05 | 1.49 |
| COMP-9 | 0 | n.m. | Yes | 0.19 | 0.98 | 1.10 |
| INV-4 | 28 | 0 | No | 0.16 | 1.12 | 1.22 |
| INV-5 | 21 | 0 | No | 0.16 | 1.23 | 1.26 |
| COMP-10 | 12 | 7 | Yes | 0.16 | 1.30 | 1.30 |
| INV-6 | 28 | 0 | No | 0.15 | 1.20 | 1.25 |
| INV-7 | 21 | 0 | No | 0.16 | 1.30 | 1.32 |
| COMP-11 | 12 | 6 | Yes | 0.16 | 1.18 | 1.53 |
| COMP-12 | 12 | n.m. | Yes | 0.16 | 0.90 | 1.24 |
| INV-8 | 28 | 0 | No | 0.15 | 0.66 | 1.24 |

From Table 5, it should be clear that using 12 wt % of the low viscous monomer was not enough to establish a good curl property after drying for 15 minutes at 80° C. of the coating. Furthermore on laser marking, blisters in Dmax were no longer observed for the cured, coated samples containing 21 and 28 wt % of a monomer having a viscosity of less than 100 mPa·s at 25° C. and at a shear rate of 100 $s^{-1}$. In this example as well as in general, it was observed that a higher sensitivity for laser marking and Dmax could be obtained for laser markable layers containing polystyrene as the laser markable polymer.

Example 3

Cracking may occur on bending of a security film. This example illustrates that the nature of the low viscous monomer influences this cracking behaviour.

Preparation of Security Films

The coating compositions INV-9 and INV-10 were prepared by mixing the components according to Table 6. The

TABLE 6

| wt % of | INV-9 | INV-10 |
|---|---|---|
| LADPS | 2.5 | 2.5 |
| PS02-sol | 68.5 | 68.5 |
| SR238 | 5.6 | — |
| CD561 | — | 5.6 |
| TPO | 0.2 | 0.2 |
| MEK | 23.2 | 23.2 |

The coating compositions INV-9 and INV-10 were each coated at a wet coating thickness of 100 µm on a Mitsubishi White PET support using the Elcometer Bird Film Applicator (from ELCOMETER INSTRUMENTS) and subsequently dried for 15 minutes at 80° C.

All coated samples were cured using a Fusion DRSE-120 conveyer equipped with a Fusion VPS/1600 lamp (D-bulb) which transported the sample under the UV-lamp on a conveyer belt at a speed of 20 m/min for a UV exposure of 250 $mJ/m^2$.

Evaluation and Results

The cracking behaviour was evaluated by bending a coated sample over 45° and then visually inspecting the sample using a microscope. For evaluating the laser marking on the coated samples, first a 125 µm thick transparent, non-laser markable polycarbonate foil Makrofol™ DE 1-1 from BAYER was laminated onto the laser markable layer of each coated samples using an Oasys OLA6/7 laminator at a temperature setting of 205° C. The presence of an overlay prevents laser engraving to occur, i.e. the ablation of material by the laser which would lead to the measurement of a lower Dmax. After lamination, a test image containing a wedge with different grey-levels (six squares of 9×9 mm) was laser marked on all the coated samples using a Rofin RSM Powerline E laser (10 W) with settings 29 ampere and 22 kHz. The maximum optical density was measured in square 6 (RGB-values=12 of this area in the bitmap-image). The sensitivity for laser marking was evaluated by measuring the optical density in square 4. The results are shown in Table 7.

TABLE 7

| Sample | Curl (mm) | Cracks | $D_{min}$ | Sensitivity | $D_{max}$ |
|---|---|---|---|---|---|
| INV-9 | 0 | Yes | 0.15 | 0.71 | 1.3 |
| INV-10 | 0 | No | 0.17 | 0.59 | 1.15 |

Table 7 shows that replacing hexanediol diacrylate by alkoxylated hexanediol diacrylate improves the cracking on bending the respective security films.

Example 4

This example illustrates how a ghost image can be made by laser marking using a double side laser markable security film.

Preparation of a PET-C support PET-C1

A coating composition SUB-1 was prepared by mixing the components according to Table 8 using a dissolver.

TABLE 8

| Component | wt % |
|---|---|
| Water | 77.87 |
| Resorcine | 0.99 |
| Bayhydrol ™ UH2558 | 18.55 |
| Paresin | 0.57 |
| DR274 | 0.68 |
| DR270 | 1.34 |

A 1100 µm thick polyethylene terephthalate sheet was first longitudinally stretched and then coated on both sides with the coating composition SUB-1 to a wet thickness of 10 µm. After drying the longitudinally stretched and coated polyethylene terephthalate sheet was transversally stretched to produce a 63 µm thick sheet PET-C1 coated with a transparent and glossy subbing layer.

Preparation of Laser Additive Dispersion LADPS2

A concentrated carbon black dispersion was prepared by dissolving 300.0 g of PS02-sol in a vessel containing 127.5 g of MEK using a DISPERLUX™ disperser (from DISPERLUX S.A.R.L. Luxembourg).and 22.5 g of Special Black 25 was added to the solution and stirred for 30 minutes. The vessel was then connected to a NETZSCH ZETAMILL filled having its internal volume filled for 50% with 0.4 mm yttrium stabilized zirconia beads ("high wear resistant zirconia grinding media" from TOSOH Co.). The mixture was circulated over the mill for 1 hour at a rotation speed in the mill of about 10.4 m/s (3.000 rpm). 290 g of the concentrated laser additive dispersion was recovered.

8.0 g of the concentrated laser additive dispersion was then added to a plastic bottle of 2.000 mL containing 659.0 g of MEK and 333.0 g of PS02-sol. This mixture was put onto a roller mill without using beads for 1 hour at a rotation speed set at 150 rpm to deliver the laser additive dispersion LADPS2 containing 2.000 ppm of Special Black 25.

Preparation of Double Side Laser Markable Security Film SF-1

The coating compositions CC-8 and CC-9 were prepared by mixing the components in the order according to Table 9.

TABLE 9

| | Coating Compositions | |
|---|---|---|
| wt % of | CC-A | CC-B |
| BS | 0.10 | 0.29 |
| MEK | 86.16 | 59.89 |
| PS02 | 7.42 | 21.49 |
| Zylar ™ 631 | 1.11 | 3.22 |
| LADPS2 | 1.00 | 2.90 |
| CD561 | 3.01 | 8.71 |
| TPO | 1.20 | 3.50 |

The coating composition CC-A was then coated with an Elcometer Bird Film Applicator (from ELCOMETER INSTRUMENTS) on both sides of the subbed PET-C support PET2 at a coating thickness of 100 μm and subsequently dried for 15 minutes at 50° C.

The coated sample was partially cured using a Fusion DRSE-120 conveyer equipped with a Fusion VPS/1600 lamp (D-bulb) which transported the sample under the UV-lamp on a conveyer belt at a speed of 20 m/min for a UV exposure of 250 $mJ/m^2$.

The coated sample was the coated on both sides with the coating composition CC-B using the Elcometer Bird Film Applicator (from ELCOMETER INSTRUMENTS) at a coating thickness of 100 μm and subsequently dried for 15 minutes at 50° C.

The coated sample was partially cured using a Fusion DRSE-120 conveyer equipped with a Fusion VPS/1600 lamp (D-bulb) which transported the sample under the UV-lamp on a conveyer belt at a speed of 20 m/min for a UV exposure of 250 $mJ/m^2$.

On both sides of the coated sample a thermo adhesive layer was coated using a coating composition CC-C according to Table 10. The coating was performed with the Elcometer Bird Film Applicator (from ELCOMETER INSTRUMENTS) at a coating thickness of 80 μm and then subsequently dried for 15 minutes at 50° C.

TABLE 10

| Components of CC-10 | wt % |
|---|---|
| MEK | 87.5 |
| UCAR ™ VAGD | 12.5 |

The coated sample was cured using a Fusion DRSE-120 conveyer equipped with a Fusion VPS/1600 lamp (D-bulb) which transported the sample three times under the UV-lamp on a conveyer belt at a speed of 20 m/min for a UV exposure of 250 $mJ/m^2$ to deliver the double side laser markable security film SF-1.

Preparation of Overlay OV-1

The coating compositions SUB-2 and SUB-3 were prepared by mixing the components according to Table 11 respectively Table 12 using a dissolver.

TABLE 11

| Components of SUB-2 | mL |
|---|---|
| water | 666.0 |
| VIN1 | 189.0 |
| PEDOT/PSS | 82.3 |
| KIESELSOL ™ 100F | 17.5 |
| Mersol | 45.0 |

TABLE 12

| Components of SUB-3 | g |
|---|---|
| water | 939.9 |
| 26% NH4OH solution in water | 0.3 |
| Kelzan ™ S | 0.3 |
| PEDOT/PSS | 30.0 |
| KIESELSOL ™ 100F | 0.6 |
| Zonyl ™ FSO100 | 0.6 |
| Poligen ™ WE7 | 0.2 |
| PMMA | 30.1 |

A 1100 μm thick polyethylene terephthalate sheet was first longitudinally stretched and then coated on one side with the coating composition SUB-2 to a wet thickness of 9 μm. After drying the longitudinally stretched and coated polyethylene terephthalate sheet was transversally stretched to produce a 63 μm thick sheet which was then coated on the same side of the SUB-3 subbing layer with the coating composition SUB-3 to a wet thickness of 33 μm. The resulting layers were transparent and glossy.

An adhesive composition was prepared by mixing 50 g of Liofol™ UR 3640, a polyurethane solvent (ethyl acetate) adhesive, with 1 g of Liofol™ hardener UR 6800. The adhesive composition was applied using a Braive coating apparatus with a wire-rod to a wet thickness of 20 μm on top of the subbing layer made with the coating compositions SUB-3 was applied using a Braive coating apparatus with a wire-rod to a wet thickness of 20 μm. and dried at 50° C. for 2 minutes. The adhesive layer-coated side of the overlay were then laminated to a 35 μm PETG sheet (Rayopet from AMCOR) using a cold roll laminator to deliver the overlay OV-1.

Preparation of Security Document SD-1 and Results

The symmetrical double side laser markable security film SF-1 was simultaneously laminated on one side with a 500 μm Opaque PETG core and on the other side to the PETG side with the overlay OV-1 by a Laufferpress LE laminator using the settings 10 minutes at 130° C. with 125N A4 size in order to deliver the security document SD-1.

A test image containing a wedge with different grey-levels (six squares of 9×9 mm) was laser marked on the security document SD-1 using a Rofin RSM Powerline E laser (10 W) with settings 29 ampere and 22 kHz. The maximum optical density measured in square 6 (RGB-values=12 of this area in the bitmap-image) was 1.23.

After destruction of the laser marked Security Document by delamination of the overlay and removal of the layers between the 63 μm PETC and the 500 μm Opaque PETG core, a ghost image became visible on the outermost laser markable layer having an optical density of 0.07.

The invention claimed is:

1. A security film including a support and a laser markable layer, wherein the laser markable layer includes:

i) a laser additive;

ii) a polymer selected from the group consisting of polystyrene polycarbonate and styrene acrylonitrile;

iii) a initiator; and iv) at least 15 wt % of radiation curable compound based on the total dry weight of the laser markable layer, wherein the radiation curable compound has a viscosity of less than 100 mPa·s at 25° C. and at a shear rate of 100 $s^{-1}$, wherein the laser additive is carbon black present in amount of less than 0.08 wt % based on the total weight of laser markable polymer(s).

2. The security film according to claim 1 wherein the support is a biaxially oriented polyethylene terephthalate support.

3. The security film according to claim 1, wherein the support is transparent.

4. The security film according to claim 2, wherein the support is transparent.

5. The security film according to claim 1, wherein the radiation curable compound is an (meth)acrylate.

6. The security film according to claim 4, wherein the radiation curable compound is an (meth)acrylate.

7. The security film according to claim 4, wherein the radiation curable compound is hexanediol diacrylate and/or alkoxylated hexanediol diacrylate.

8. The security film according to claim 1, wherein the polymer in the laser markable layer is polystyrene.

9. The security film according to claim 4, wherein the polymer in the laser markable layer is polystyrene.

10. The security film according to claim 1, further containing a thermo adhesive layer.

11. The security film according to claim 3, further containing a thermo adhesive layer.

12. The security film according to claim 10, wherein the thermo adhesive layer contains a copolymer of vinylchloride, vinylacetate and vinylalcohol.

13. The security film according to claim 11, wherein the thermo adhesive layer contains a copolymer of vinylchloride, vinylacetate and vinylalcohol.

14. The security film according to claim 1, wherein a second laser markable layer is present on the other side of the support than the side having the laser markable layer.

15. The security film according to claim 2, wherein a second laser markable layer is present on the other side of the support than the side having the laser markable layer.

16. A security document containing the security film according to claim 1.

17. The security document according to claim 16 containing security print visible through the laser markable layer.

18. The security document according to claim 16 containing a white support or layer.

19. The security document according to claim 17 containing a white support or layer.

20. A method for preparing a security film as defined by claim 1 comprising the steps of:

a) providing a transparent biaxially oriented polyethylene terephthalate support having a subbing layer; and b) coating a laser markable layer on the subbing layer using a composition including:

i) a laser additive;

ii) a polymer selected from the group consisting of polystyrene, polycarbonate and styrene acrylonitrile;

iii) a initiator; and iv) at least 15 wt % of radiation curable compound based on the total dry weight of the laser markable layer, wherein the radiation curable compound has a viscosity of less than 100 mPa·s at 25° C. and at a shear rate of 100 $s^{-1}$.

* * * * *